(12) United States Patent
Ball

(10) Patent No.: US 8,219,649 B2
(45) Date of Patent: Jul. 10, 2012

(54) AUTOMATED DEPLOYMENT OF CHANGE AND CONFIGURATION MANAGEMENT SOFTWARE TOOLS

(75) Inventor: Jonathan H. Ball, Frisco, TX (US)

(73) Assignee: CA, Inc., Islandia, NY (US)

( * ) Notice: Subject to any disclaimer, the term of this patent is extended or adjusted under 35 U.S.C. 154(b) by 1389 days.

(21) Appl. No.: 11/457,024

(22) Filed: Jul. 12, 2006

(65) Prior Publication Data

US 2008/0016186 A1    Jan. 17, 2008

(51) Int. Cl.
*G06F 15/177* (2006.01)
(52) U.S. Cl. .......... 709/220; 709/227; 726/3; 726/8
(58) Field of Classification Search .......... 709/220, 709/227; 726/3, 8
See application file for complete search history.

(56) References Cited

U.S. PATENT DOCUMENTS

| | | | |
|---|---|---|---|
| 7,613,704 B2 * | 11/2009 | Lobo | 1/1 |
| 2004/0117439 A1 * | 6/2004 | Levett et al. | 709/203 |
| 2005/0044531 A1 * | 2/2005 | Chawla et al. | 717/122 |
| 2006/0265740 A1 * | 11/2006 | Clark et al. | 726/8 |

* cited by examiner

*Primary Examiner* — Adnan Mirza
(74) *Attorney, Agent, or Firm* — Baker Botts L.L.P.

(57) ABSTRACT

A system and method for automatically deploying a change and configuration management software tool to a web application server includes launching a configurable wizard application programmed to solicit data from a user. The user is queried regarding a desired web application server and database connectivity authentication parameters. A location on the user's system of the desired web application server's installation package is identified. The user's input is integrated with the selected web application server. The change and configuration management software tool is automatically deployed to the desired web application server.

17 Claims, 3 Drawing Sheets

AUTOMATED DEPLOYMENT OF CHANGE AND CONFIGURATION MANAGEMENT SOFTWARE TOOLS

TECHNICAL FIELD OF THE INVENTION

The teachings of the present invention relate generally to network management tools and more particularly, to a method and system for automated deployment of change and configuration management software tools.

BACKGROUND OF INVENTION

During the early development of the World Wide Web (WWW), web development tools were limited in their ability to create dynamic Web applications that connected client to server and operated with other computing resources, such as databases. Until recently, HyperText Markup Language (HTML) was the dominant technology used in development of Web-based solutions. However, HTML quickly proved inadequate in a number of areas, including: (i) limited ability to generate only static websites; (ii) inability to scale; (iii) extreme slowness in case of sizable content; and (iv) necessity of updating material stored in HTML.

As sites on the World Wide Web grew increasingly complex to meet evolving consumer and user demands, developers sought means to provide web sites with dynamic content. Developers have since largely turned to web application servers to meet these needs. A web application server is regarded as a "middleman" server that operates between a Web server and one or more back-end servers, such as database, transaction, or advertising servers. Web application servers are frequently used by software developers to construct and work with various applications that operate on web sites dynamically. While a web application server is not a web application itself, it serves to provide the framework and environment in which web applications can be made. A simple example of a web application server might be the server that updates data on an Internet stock ticker.

Web browsers alone lack the necessary functionality to provide dynamic data. Web browsers simply make requests to web servers, which in turn fulfill those requests by returning the requested information to the browser. This information is usually delivered via HTML files or other, typically static, file types. Acting alone, web servers are of limited capability because they merely process user requests and respond by outputting data. They do not: (i) allow users to interact dynamically with databases, (ii) provide customized information and settings based on user requests, preferences, or history, or (iii) provide dynamic data such as stock market information. Thus, to extend the capabilities of a web server, a web application server is also often used. By using web application servers, web developers can build highly interactive and data-rich websites, including sites such as Amazon.com that utilize customer "shopping carts," Ameritrade.com and other e-commerce or financial sites, and websites that are synchronized with database applications which can be queried using any number of user-defined criteria.

In addition to providing an environment in which a developer may create web applications, a web application server also provides developers with the numerous useful advantages and capabilities of the programming language used. These include templating, security modeling, scalability, data persistence, session renewal and many other features that developers find useful when constructing a web application. Common web application servers include Tomcat, IBM's WebSphere, and Sun's Java System Web Server.

AllFusion Harvest Change Manager ("Harvest") is a comprehensive, integrated, repository-based change and configuration management solution. Also known as a 'Change and Configuration Control' ("CCC"), Harvest is essentially a software tool that allows users to manage complex, enterprise-wide software development activities at each stage of the application development cycle. For the purposes of this specification the following terms may be used interchangeably, and are intended to have the same meaning: change and configuration management, change management, configuration management, change and configuration control, change control, configuration control, change management and configuration management. Such products are used to manage change in software, in a controlled manner that allows a user to track changes that were made.

Harvest is made available by CA, Inc., and additional information regarding Harvest is available at www.ca.com. The deployment of applications such as Harvest to web application servers provides developers with a very powerful combination and an extremely robust programming environment. With such an arrangement, the intrinsic programming tools available to developers using Harvest are integrated over a network, allowing numerous developers to collaborate simultaneously to develop a project.

This arrangement also allows developers to collaborate remotely, over a local network server or across the Internet if desired. This being so, it allows developers to manage source code and other software development assets collectively across a network server. This allows developers working at different locations, on different portions of the same software application, to modify freely the software, experiment, and collaborate in the development process. Programs like Harvest are generally fully scalable and equipped to serve project teams working on both large and small distributed enterprise systems.

Numerous vendors provide the necessary software for setting up a web application server. Once set up, the web application servers provide numerous benefits and relative ease of use for developers. However, the deployment of software to the web application server requires technological skills and training that many information systems professionals may not possess. Deployment of software, such as Harvest, to a web application server requires a sizeable expenditure of time and resources by one of advanced skill in order to successfully deploy the software. For example, previous versions of Harvest used a command line utility to package a web application properly, and relied upon manual user steps to deploy the application to the application server (e.g., IBM's Websphere). Accordingly, in order to successfully deploy Harvest to a web application server, end users need a substantial familiarity with both Harvest and the web application server, with various parameters that were solicited during the deployment process, and with the proper commands necessary during the command line entry process used to deploy.

SUMMARY OF THE INVENTION

The teachings of the present invention provide a system and method for automated deployment of change and configuration management software tools that accommodate simplified, expedited and seamless deployment of change and configuration management software to a web application server of the user's choice. For example, the teachings of the present invention may be used to automate the deployment of the AllFusion Harvest Change Manager to one of several web application servers.

In accordance with a particular embodiment of the present invention, a method of implementing a wizard-like interface which queries the user to enter certain information in pre-arranged form fields, is provided. The interface may be used to dynamically insert the user-entered values in the appropriate fields and execute the deployment of change and configuration management software tools to the web application server of the user's choice.

In accordance with another embodiment of the present invention a system is provided whereby the user's entries and selection of web application server are written into a subroutine which automatically carries out the deployment.

Technical advantages of particular embodiments of the present invention include a system and method for automated deployment of change and configuration management software tools that are compatible with several of the most commonly used web application servers. Such web application servers include Tomcat 4.1, Tomcat 5.1, IBM WebSphere Application Server, and Sun's Java System Web Server.

Further technical advantages of particular embodiments of the present invention includes a system and method for automated deployment of change and configuration management software tools that operates by bundling all the steps required to successfully deploy a web application server to Harvest and provides a simple wizard-like interface with which an end-user interacts. This greatly expedites the deployment process and reduces significantly the potential for human error. The present invention also offers multi-platform compatibility, and is capable of operating on platforms as diverse as Microsoft Windows XP, Unix, Linux and other open-source operating systems.

Other technical advantages will be readily apparent to one skilled in the art from the following figures, descriptions, and claims. Moreover, while specific advantages have been enumerated above, various embodiments may include all, some or none of the enumerated advantages.

DETAILED DESCRIPTION OF THE INVENTION

The teachings of the present invention provide a system and method of automating the deployment of a change and configuration management software tool to one of several web application servers. In accordance with a particular embodiment of the present invention, a wizard-like user interface is used to capture user-entered information that is necessary to deploy the web application (e.g., Harvest) to a web application server. The server is then re-started to properly start the application on-the-fly. Following the completion of the wizard, the web application is ready to be accessed and used. In accordance with a particular embodiment of the present invention, a Java application is used to solicit and collect information from the user, and deploy the web application to a web application server.

Figure 1A:
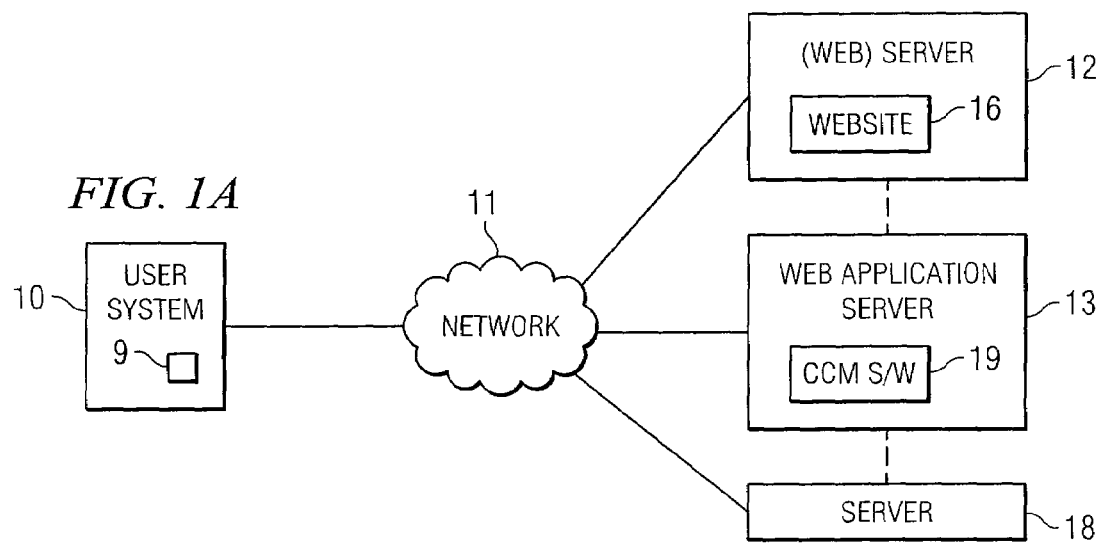
FIG. 1A illustrates components of a communication network suitable for use within the teachings of the present invention.

FIG. 1A illustrates a network configuration in which the teachings of the present invention may be employed. A browser 9 (e.g., web browser) that resides upon a user system 10 communicates with a network 11 to exchange information. For example, user system 10 may use network 11 to access information stored on one or more servers. User system 10 may run any of various operating systems, including Microsoft Windows, UNIX, Linux and/or z/OS. In the illustrated embodiment of FIG. 1A, a server 12 hosts a web site that is accessible to a user of user system 10. If server 12 is a web server, it can store and access static content to be delivered to the user.

Web application server 13 allows web server 12 access to dynamic content that is stored on another server, for example, server 18. In many ways, web application server 13 acts as a "middle-man" between web server 12 and server 18. Web application server 13 may be any of various web application servers, for example: (i) a Tomcat web application server, an IBM Websphere web application server, a Sun Java web application server, and/or a JBoss web application server. Web application server 13 may run any of various operating systems including Microsoft Windows, UNIX and/or Linux.

Server 18 stores dynamic content that can be made available to web server 12. In the illustrated embodiment, server 18 is a "back-end" server that may be used to store practically any dynamic content, for example database information, transactions or advertising content. Web application server 13 may include various software elements and tools, for example change and configuration management software 19. In accordance with a particular embodiment of the present invention, change and configuration management software may maintain a database of information under its control locally, or in a remote location. The database may be an Ingres, Oracle, or Microsoft SQL database, among others. The change and configuration management software may also include various software development kits ("SDKs"), for example the Harvest SDK, the Java SDK and the Component Object Model SDK.

Figure 1B:
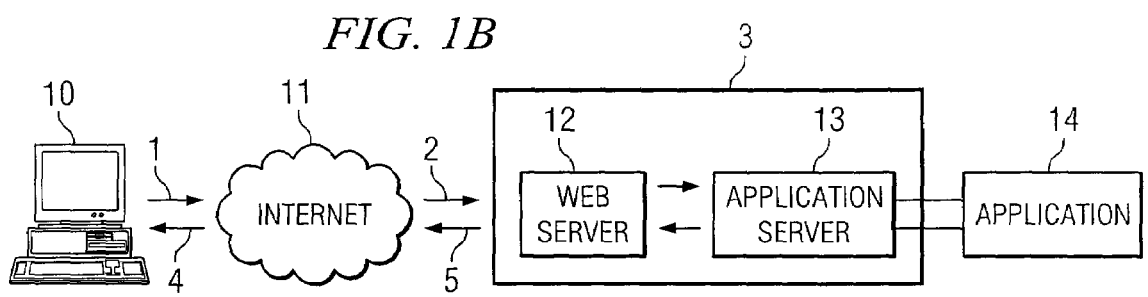
FIG. 1B illustrates web application server functionality, in accordance with a particular embodiment of the present invention.

A representative environment in which a web application server operates is depicted in FIG. 1B, which illustrates a typical network configuration between a user system 10 communicating through a network, for example the Internet 11. Initially, the user enters or requests a website on the computer 10 (step 1). The desired web server 12 receives the request through the Internet 11 (step 2), and begins processing it. If only static html is being used, the web server 12 delivers the desired information to the user's system or computer 10 and the process is complete (steps 4 and 5). However, if a web application server 13 exists and the user is seeking dynamic content, the web server 12 instructs the web application server 13 to process the page accordingly (step 3). In turn, the web application server 13 utilizes the necessary application 14 in order to process the user's 10 request. Thus, the web application server 13 processes the output from the application 14, and generates it as output to the web server 12, which subsequently relays the data over the Internet 11 to the user 10 (steps 4 and 5).

Although the Internet is the network that is used in the embodiment illustrated in FIG. 1B, it should be recognized that other networks could be used in accordance with the teachings of the present invention. For example, instead of the Internet, network 11 may be any computer or communication network capable of coupling two or more clients and/or servers, for communication. Communication network 11 may be a wide area network (WAN) that enables communication between a plurality of clients and/or servers distributed across multiple cities and geographic regions and may include communication over the public switched telephone network (PSTN). The communication network 11 may also include one or more networks, including the Internet, the public switched telephone network, local area networks (LANs), global distributed networks such as intranets, extranets, or other form of wireless or wireline communication networks. Such networks may include any combination of routers, hubs, switches, gateways (e.g. gateway 42) or other hardware, software, or embedded logic implementing any number of communication protocols User system 10 may include any combination of hardware, software, and/or encoded logic that provide communication services to a user. Although FIG. 1 illustrates a single user system 10, network 11 may be coupled with any number and/or arrangement of user systems for communicating media.

In accordance with the teachings of the present invention, the application 14 may comprise the AllFusion Harvest Change Manager, and the user operating user system 10 may be a software developer. In such an embodiment, the web application server need not actually run on the WWW (e.g., communicate over the Internet) in order to function—all that is necessary is a server operating on a network.

Figure 2:
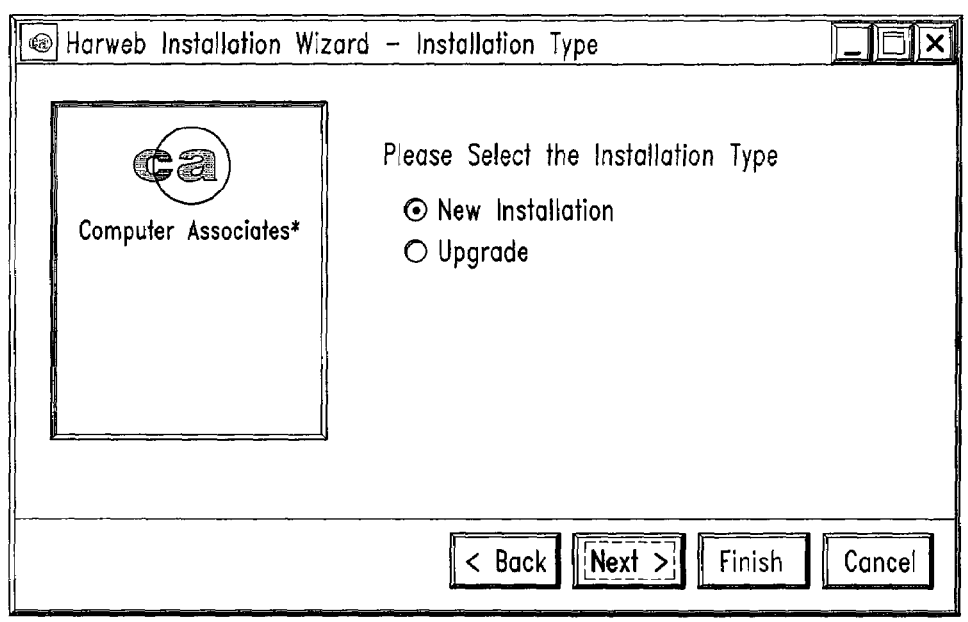
FIG. 2 illustrates an example screen shot of an installation wizard suitable for use within the teachings of the present invention.
Figure 3:
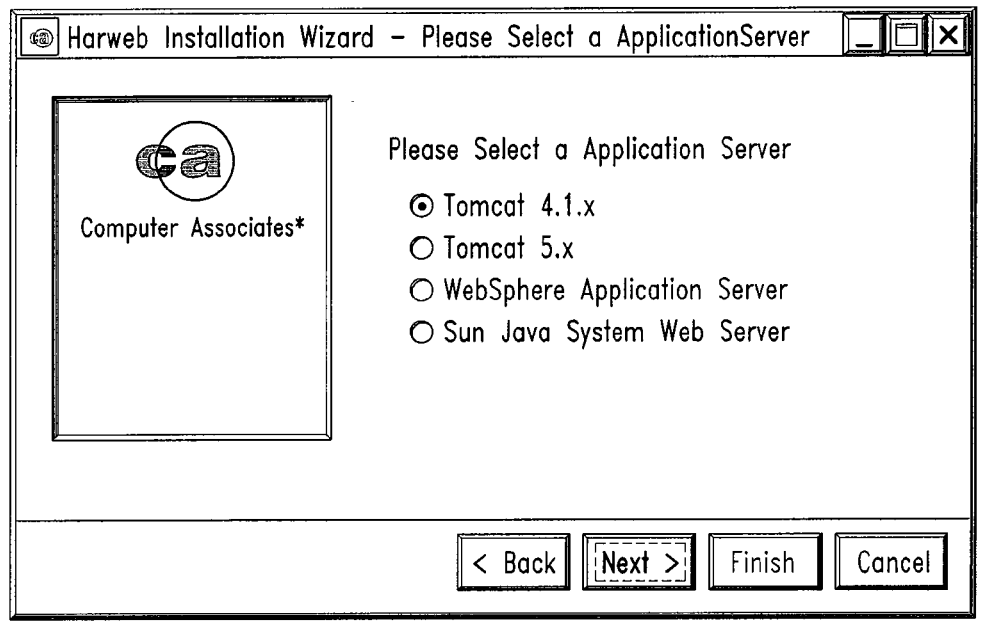
FIG. 3 illustrates another example screen shot of an installation wizard suitable for use within the teachings of the present invention.

FIG. 2 and FIG. 3 depict example screen shots from two different stages of the present invention, in which a wizard-like installation tool is used to solicit information from the user. FIG. 2 shows the point at which the user is asked whether the installation is a new one or an upgrade. This information is used to determine the amount of code to be installed, replaced, and/or modified, during the installation process.

FIG. 3 depicts an example screen shot of one stage of the present invention in which the user is asked which web application server is to be used. The present invention is configured in such a manner so as to have wide compatibility with various web application servers, including web application servers provided by Tomcat, Apache, Sun, and IBM.

Figure 4:
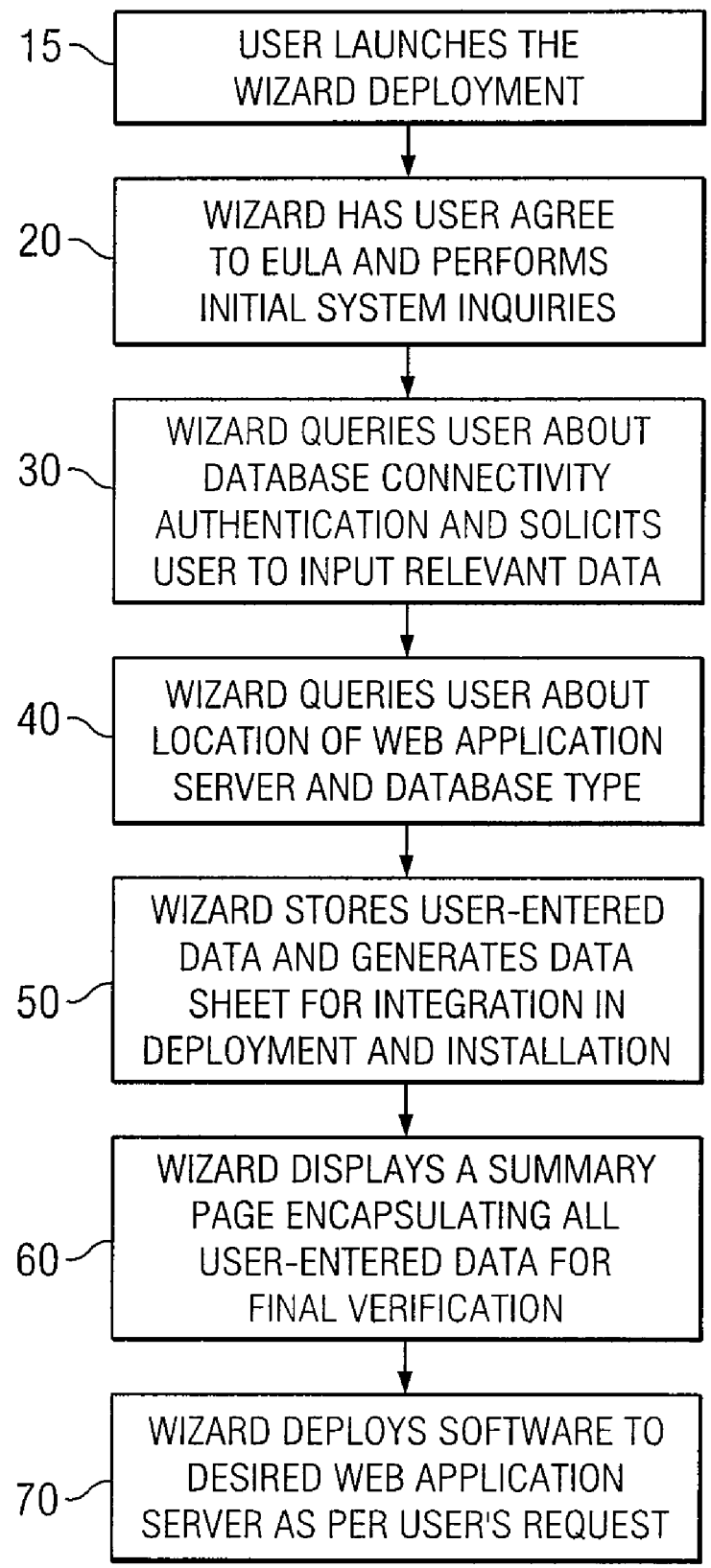
FIG. 4 illustrates a method for automated deployment of change and configuration management software tools, in accordance with a particular embodiment of the present invention.

FIG. 4 illustrates an example method for deploying a change and configuration management software tool to a web application server. At step 15, the user launches a wizard that resides on user system 10, using whatever means as are appropriate according to the user's operating system (e.g., Windows, Linux, Unix, etc.). Upon launch, the wizard displays the End-User License Agreement (EULA) and performs a series of initial system inquiries 20 to facilitate the deployment process. Such initial system inquiries can include questions as to the Administrator's name, company, scope of desired access, and other inquiries typical in most installations of servers and other networking tools. Typically, the initial system inquiries 20 will ask the user which web application server the user wishes to use.

The wizard then queries the user as to database connectivity authentication 30 and solicits the user to enter other relevant data 30 in order to establish the user's preferences in installation and deployment. The data that that user enters may depend on the selected web application server. For example, if IBM WebSphere is selected, the user is asked to enter the Application Server Home and the context root. If Sun Application Server is selected, the user will be prompted for the Application Server Home, the context root, and the appropriate domain.

Next, the wizard will ask the user to point out the location of the web application server's installation package or directory 40. For example, the installation package may reside on user system 10. This step is provided to integrate the data input by the user into a format that will allow successful deployment to the desired web application server 50. The wizard will also ask the user to select a database type 50 and further solicit information regarding the database depending on the type selected. Upon being directed towards the appropriate installation package or directory on the user's system and selecting and configuring a database type, the wizard may display a final summary page 60 for the user recapping the pertinent details of the deployment. The summary page, an exemplary screenshot of which is shown in FIG. 5, may include a list showing all the data that user has previously entered, may highlight the web application server the user has selected and the precise location of the installation package or directory, and other data relevant to the deployment.

Finally, after the user has reviewed the summary page and found it to be satisfactory, the wizard proceeds to the final step in which it deploys Harvest to the desired web application server 70.

Figure 5:
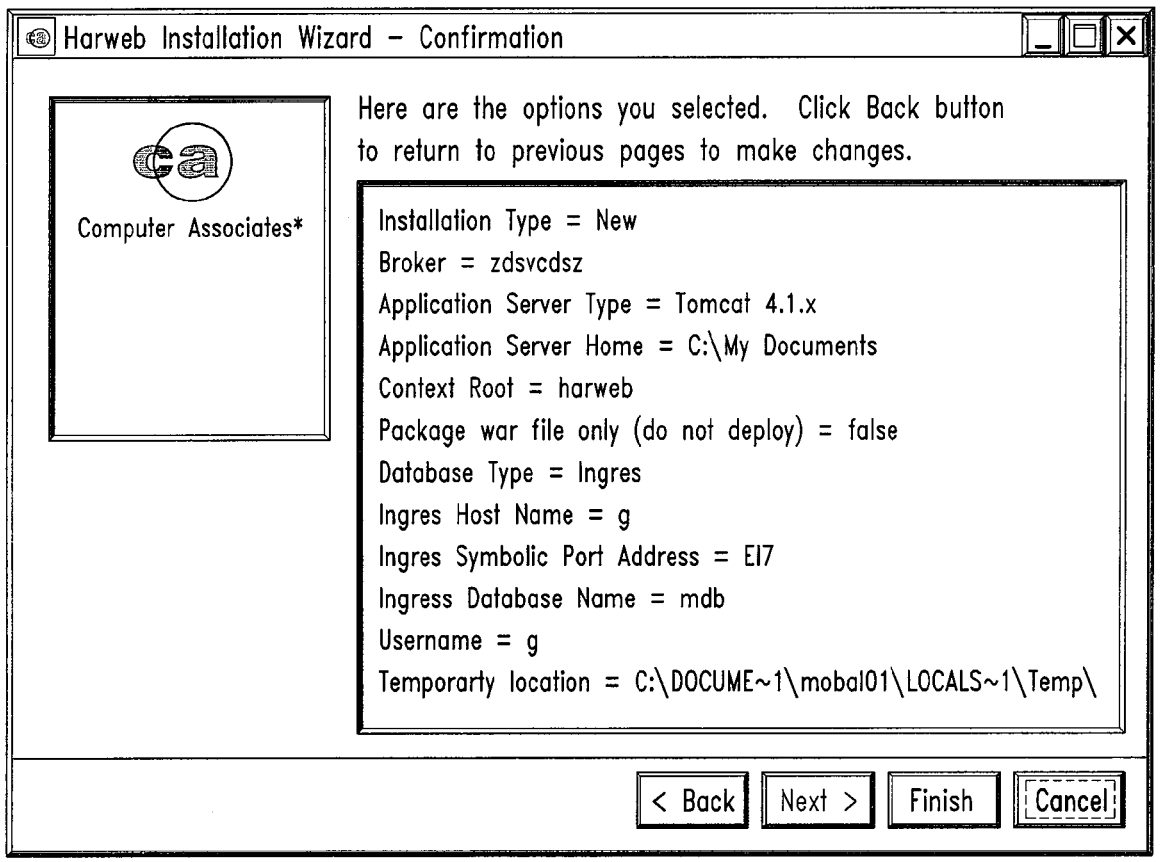
FIG. 5 illustrates an example screen shot of an installation wizard's summary page, in accordance with a particular embodiment of the present invention.

FIG. 5 depicts an exemplary screen shot of the summary page which is displayed prior to deployment of Harvest to the specified web application server. FIG. 5 shows a deployment to Tomcat 4.1, wherein the Application Server is located in the directory "C:\My Documents," the database type is Ingres and is of the format .mdb (Microsoft Database).

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for automatically deploying a change and configuration management software tool to a web application server, comprising:
   launching a configurable wizard application programmed to solicit data from a user;
   querying the user for information regarding a type or brand of a desired web application server for receiving the change and configuration management software tool;
   querying the user as to database connectivity authentication parameters;
   identifying a location of the desired web application server's installation package on the client associated with the user;
   integrating the user's input with the selected web application server; and
   automatically deploying the change and configuration management software tool to the desired web application server.

2. The method of claim 1, wherein the change and configuration management software tool comprises AllFusion Harvest Change Manager.

3. The method of claim 1, wherein the desired web application server comprises IBM Webshpere.

4. The method of claim 1, wherein the database connectivity information includes an identification of a database that the user will connect with.

5. The method of claim 4, wherein the database comprises a SQL server database.

6. A system for automatically deploying a change and configuration management software tool to a web application server, comprising:
- a processor being operable to launch a configurable wizard application programmed to solicit data from a user;
- a user interface being operable to query the user for information regarding a type or brand of a desired web application server for receiving the change and configuration management software tool;
- the user interface being further operable to query the user as to database connectivity authentication parameters;
- the processor being further operable to identify a location of the desired web application server's installation package on the client associated with the user; and
- the processor being further operable to integrate the user's input with the selected web application server and automatically deploy the change and configuration management software tool to the desired web application server.

7. The system of claim 6, wherein the change and configuration management software tool comprises AllFusion Harvest Change Manager.

8. The system of claim 6, wherein the desired web application server comprises IBM Webshpere.

9. The system of claim 6, wherein the database connectivity information includes an identification of a database that the user will connect with.

10. The system of claim 9, wherein the database comprises a SQL server database.

11. The system of claim 9, wherein the configurable wizard application is provided on a client associated with the user.

12. The system of claim 11, wherein the configurable wizard application on the client associated with the user is operable to cause the user interface on the client to query the user for information regarding the type or brand of the desired web application server for receiving the change and configuration management software tool.

13. The system of claim 11, wherein the configurable wizard application on the client associated with the user is operable to cause the user interface on the client to query the user for identification of a database that the user desires the client to connect with.

14. The method of claim 1, further comprising providing the configurable wizard application on a client associated with the user.

15. The method of claim 14, wherein querying the user for information regarding the type or brand of the desired web application server comprises:
- using the configurable wizard application on the client associated with the user to query the user for information regarding the type or brand of the desired web application server for receiving the change and configuration management software tool.

16. The method of claim 14, wherein querying the user as to database connectivity authentication parameters comprises:
- using the configurable wizard application provided on the client associated with the user to query the user for identification of a database that the user desires the client to connect with.

17. The method of claim 14, wherein identifying the location of the desired web application server's installation package comprises:
- using the configurable wizard application provided on the client associated with the user to identify the location of the desired web application server's installation package on the client associated with the user.

* * * * *